Jan. 14, 1930.　　　G. JAKOVA-MERTURI　　　1,743,561
CONVERTER
Filed Jan. 3, 1929
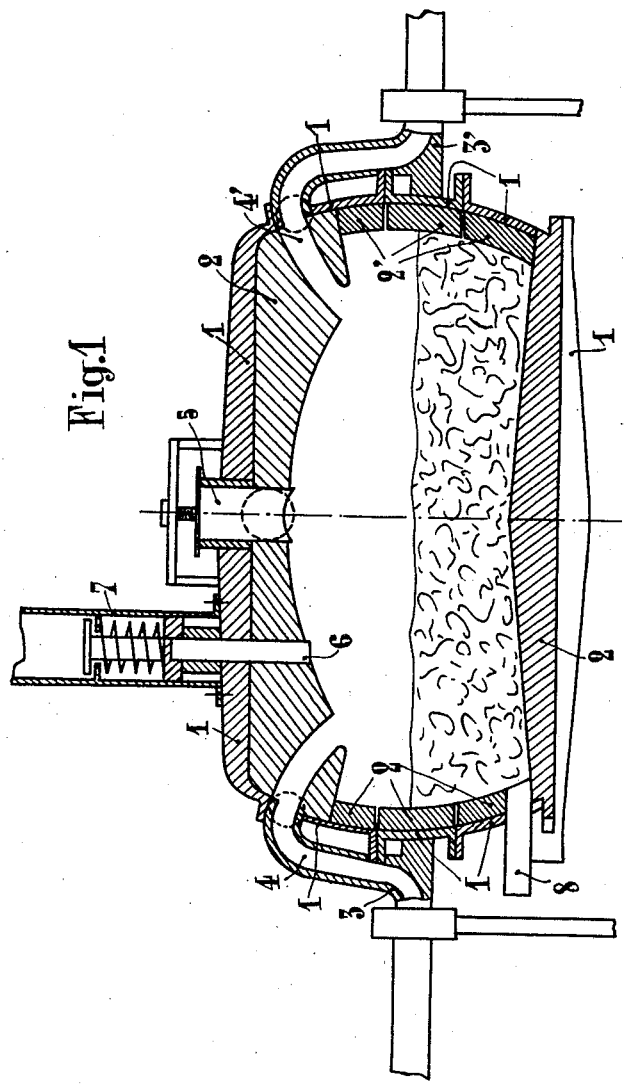
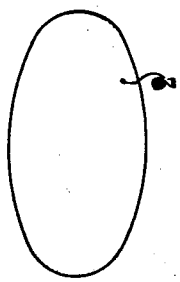
INVENTOR:
Gaspard Jakova-Merturi
BY
ATTORNEY Patented Jan. 14, 1930

1,743,561

UNITED STATES PATENT OFFICE

GASPARD JAKOVA-MERTURI, OF GAGNY, FRANCE, ASSIGNOR TO LA CARBONISATION, SOCIETE GENERALE D'EXPLOITATION DES CARBONES, OF PARIS, FRANCE, A CORPORATION OF FRANCE

CONVERTER

Application filed January 3, 1929, Serial No. 330,116, and in France January 12, 1928.

This invention relates to apparatus for transforming pig iron into desulphurized and dephosphorized steel, or into pure iron; more pariculary, to a converter for the direct manufacture of steel or iron by treating pig iron or cast iron therein in the presence of metallurgical carbon.

In order to understand the invention more clearly, reference is made to the accompanying drawing which illustrates, by way of example, a preferred embodiment of converter apparatus constructed in accordance therewith, and in which:—

Figure 1 is a vertical longitudinal section; and

Fig. 2 is a plan view, on a smaller scale, of the bottom of the converter.

The converter illustrated comprises a shell 1 made of heavy steel plate and provided at its interior with a refractory and acid lining 2, 2'. The cover and the base of the shell are demountable, as well as the side portions 2', so as to enable damaged parts to be replaced or repaired when desired. The whole is mounted on hollow trunnions 3, 3', so as to be tiltable in the course of operation; said trunnions 3, 3' branching off into conduits or twyers 4, 4', respectively, debouching into the interior of the converter chamber. reheated air or rich gas containing more or less hydrogen and carbon is blown in through twyer 4', while powdered metallurgical corbon is injected through twyer 4. Pig or cast iron is introduced through the charging opening 5, and the gases of combustion are expelled into a chimney 7 through a conduit 6 which may or may not be provided with a spring-loaded valve device 7' or the like. 8 denotes the tap hole.

The converter may be of any suitable shape, but in the preferred embodiment thereof, as illustrated, the bottom is oval, as shown in Fig. 2, and is raised in the middle. This arrangement of the bottom offers the advantage, when the apparatus is being rocked, of imparting a gyratory motion to the pig iron under treatment, whereby its surface is more rapidly changed.

Under ordinary pressure, the combustion within the converter develops a temperature of about 1500° C.; but by causing said combustion to take place under pressure, temperatures of 2000° C. can be exceeded; the ultimate result of the combustion of carbon being carbon dioxide. Carbon dioxide, however, is unstable in contact with incandescent carbon, since it is transformed into carbon monoxide; and if the combustion is conducted under pressure, it involves a cycle of carbon dioxide and carbon monoxide which succeed one another until the carbon has been completely transformed into carbon dioxide.

The operation of the converter and the process enabling steel or pure iron to be obtained with the aid of the converter will hereinafter be described.

The converter is charged with small pieces of carbon, preferably of ignited wood charcoal, whereupon preheated air is introduced through conduit or twyer 4' in order to cause combustion under pressure.

During this combustion carbon dioxide is formed which, passing over a bed of incandescent carbon, reacts with the amount of carbon required for its complete transformation into carbon monoxide which burns in the air supplied to the converter, and this cycle is repeated until the whole of the carbon is transformed into carbon dioxide, that is to say, until complete combustion has taken place.

Within a few minutes the converter reaches white heat. The conduit 6 is then opened and pig or cast iron is introduced through opening 5. When the level of the cast iron has reached up to about one-third the height of the converter, the conduit 6 is closed and superheated air is introduced through twyer 4' for a few minutes, while continually rocking the apparatus. This first operation serves to burn off most of the silica and carbon contained in the cast iron. The pressure of the superheated air supplied through twyer 4' is then reduced and suitably-powdered metallurgical carbon is introduced through twyer 4 for a few minutes, for the purpose of desulphurizing and dephosphorizing the cast iron and of removing the remainder of the silica, with formation of sodium sulphate, phosphate and silicate, while preventing complete decarburization of the cast iron.

Thereupon the pressure in the twyer 4 is decreased or entirely relieved, according to the grade of steel to be obtained, and a current of hydrogen or of rich gas (for example 50% H and 50% CO) is caused to flow into the converter through twyer 4' for a few minutes. During all the foregoing operations a continuous rocking motion is imparted to the converter. The twyers 4, 4' are next closed and the metal is run off through the tap hole 8 either immediately or after an interval, according to the grade of steel it is desired to obtain.

In the case where it is desired to obtain pure iron, the previously described operation is followed, for a few minutes, by an injection of pure hydrogen and of air under pressure, for example two atmospheres. This has the effect of entirely decarburizing the cast iron and, as the temperature exceeds 1800° C., of obtaining molten pure iron.

It should be borne in mind that the hereinbefore described methods of operation are given merely by way of example, and that they and particularly the various injections may be modified according to the chemical composition of the cast iron to be treated.

With the acid converters at present in use, it is an admitted fact that there is no elimination of sulphur and of phosphorus, but that there is, on the contrary, an increase in the content of sulphur and of phosphorus in the reduced steel, due to losses of carbon, silica, manganese and oxidized iron. Ferro-manganese losses are also comparatively heavy too (6 to 9%). On the other hand, any oxide of iron formed again sets up occlusions highly detrimental to the soundness of the steel.

In these converters, the reduction of the phosphorus to phosphorus pentoxide by excess oxygen allows iron oxide and carbon monoxide to be formed easily, since iron and carbon have more affinity for oxygen than phosphorus. There is, therefore, no possibility of eliminating phosphorus.

With basic converters, the lime constitutes the element necessary for the formation of phosphate of lime as well as of a triple silicate of lime, iron and manganese. In this case, however, since phosphorus is the source of almost all the heat required for fusion, the cast iron used must contain at least 2.5% to 3% of phosphorus so that it is impossible to treat pig iron poor in phosphorus in these converters. Moreover, the removal of sulphur is only partial and irregular.

The employment of the hereindescribed converter, however, avoids those difficulties. The presence of soda or of nitrogenous carbon not only insures elimination of sulphur and of phosphorus in the form of sodium sulphate and phosphate, but, at the same time, it prevents total decarburization and oxidation of the steel. The manganese, for the most part, is not eliminated, which constitutes a great advantage for the quality and quantity of the metal produced.

Slags derived from the foregoing treatment are richer in phosphorus and are less dense since they are poor in iron and in manganese.

I claim as my invention:

1. A converter for use in the manufacture of iron and steel, comprising an outer shell formed of a plurality of demountable sections; a refractory and acid lining within said shell, said lining also consisting of a plurality of demountable sections; a mounting for said shell comprising trunnions traversed by conduits terminating in twyers at the upper portion of the converter, one of said conduits serving for the admission of superheated air or rich gas, and the other for the admission of fuel; supports for said trunnions to permit the apparatus to be rocked; an inlet for the crude metal; and an outlet for the combustion gases.

2. A converter according to claim 1, having a bottom of oval shape and raised in the middle for the purpose of enabling a gyratory motion to be imparted to the molten metal under treatment when the apparatus is rocked.

In testimony whereof I affix my signature.

GASPARD JAKOVA-MERTURI.